(12) United States Patent
Bussmann et al.

(10) Patent No.: US 10,342,178 B2
(45) Date of Patent: Jul. 9, 2019

(54) CONCAVE SEGMENT FOR HARVEST SEPARATION

(71) Applicant: CLAAS Selbstfahrende Erntemaschinen GmbH, Harsewinkel (DE)

(72) Inventors: Jens Bussmann, Ostercaappeln (DE); Bernd H Holtmann, Sendenhorst (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 8 days.

(21) Appl. No.: 15/611,107

(22) Filed: Jun. 1, 2017

(65) Prior Publication Data
US 2017/0347529 A1    Dec. 7, 2017

(30) Foreign Application Priority Data

Jun. 3, 2016    (DE) .......................... 10 2016 110 267

(51) Int. Cl.
*A01F 12/26*    (2006.01)
*A01F 12/24*    (2006.01)

(52) U.S. Cl.
CPC .............. *A01F 12/26* (2013.01); *A01F 12/24* (2013.01)

(58) Field of Classification Search
CPC ........... A01F 12/24; A01F 12/26; A01F 12/28
See application file for complete search history.

(56) References Cited

U.S. PATENT DOCUMENTS

| 698,258 | A | * | 4/1902 | Closz | B07B 1/12 209/394 |
|---|---|---|---|---|---|
| 873,719 | A | * | 12/1907 | Closz | B07B 1/12 209/394 |
| 2,457,259 | A | | 12/1948 | Moll | |
| 3,537,459 | A | | 11/1970 | Thomas | |
| 3,716,060 | A | * | 2/1973 | Suzue | A01F 12/24 460/108 |
| 4,875,891 | A | * | 10/1989 | Turner | A01F 12/24 460/110 |
| 2002/0005034 | A1 | | 1/2002 | Schwersmann | |

(Continued)

FOREIGN PATENT DOCUMENTS

| CA | 1300458 C | 5/1995 |
|---|---|---|
| EP | 0281383 B2 | 7/1995 |

(Continued)

OTHER PUBLICATIONS

European search report for European Application No. 17 15 9480.

*Primary Examiner* — Alicia Torres
(74) *Attorney, Agent, or Firm* — Lempia Summerfield Katz LLC (57) ABSTRACT

A concave segment (6) for combine harvesters (1), which is provided for separating harvest (2), extends in a circumferential direction (65) in a curve about a concave axis (53), and includes numerous finger strips (62). The finger strips (62) each have a transverse strip (67), wherein the transverse strips (67) each extend in a direction of extension parallel to the concave axis (53), and wherein numerous fingers (63) are disposed on each of the transverse strips (67). The fingers (63) have a curved cross section thereby, and/or the transverse strips (67) have a wave shape (74) in the direction of extension (70).

19 Claims, 4 Drawing Sheets

(56) References Cited

U.S. PATENT DOCUMENTS

2014/0087793 A1    3/2014  Regier
2015/0250101 A1    9/2015  Kile

FOREIGN PATENT DOCUMENTS

EP    1163835 A1   12/2009
EP    2327290 A2    6/2011
EP    2594126 A1    5/2013

* cited by examiner

CONCAVE SEGMENT FOR HARVEST SEPARATION

CROSS REFERENCE TO RELATED APPLICATIONS

This application claims priority to German Patent Application No. DE 102016110267.9, filed Jun. 3, 2016, the entire disclosure of which is hereby incorporated herein by reference.

BACKGROUND

Harvest can flow axially or tangentially through a threshing unit and/or a separating device for a combine harvester. Different types of devices and combine harvesters can thus differ, depending on the direction of the harvest flow. Tangential combine harvesters and hybrid combine harvesters have a tangential threshing unit. Hybrid combine harvesters have at least one tangential separating device. Axial combine harvesters have, in contrast, an axial separating device, which also has a threshing section. Axial combine harvesters thus do not have a structurally separate threshing unit.

Tangential threshing units include threshing concaves, and axial separating devices include separating concaves. The concaves of the threshing units and the separating devices have passages. These are frequently designed as comb-like finger strips, which are attached to a frame, and form a replaceable concave segment with the finger strips. This has the advantage that when the finger strips are worn out, they can be easily replaced. Furthermore, by changing to finger strips of different sizes, the passages of the separating concave are altered, and adapted to the respective harvest.

In this regard, EP 2 594 126 A1 discloses finger strips of a separating concave which are attached such that they are flush on the frame of a concave segment. The fingers of the finger strips have a free end, which extends freely into space. Furthermore, deflector strips can be attached to the finger strips to improve the separation performance.

The deflector strips can abut the finger strips in a form-fitting manner, merge into them, or extend beyond the finger strips toward the rotor axis.

EP 0 281 383 B2 discloses finger strips of a separating concave, the fingers of which are disposed in an offset manner. The free ends of the fingers of the finger strips likewise extend freely into space. In addition, the finger strips have a T-like structure, wherein an end surface of a leg of the finger strips functions as a deflector surface.

It has been shown that the finger strips of the separating concave, and in particular their fingers ending freely in space, must exhibit a high material strength, in order to withstand the forces and loads acting on them during the separating process. A high material strength leads, however, to a high weight, and to large bending radii.

SUMMARY

The present disclosure relates to a concave segment for a combine harvester, provided for the separation of harvest, which extends in a direction of the circumference about the concave axis in a curve, and includes numerous finger strips. The finger strips each have a transverse strip, wherein the transverse strips each extend in a direction of extension parallel to the concave axis, and wherein numerous fingers are disposed on the transverse strips. The present disclosure furthermore relates to a concave having such concave segments and a combine harvester having such concave segments.

The concave segment for harvest separation has finger strips that have an equal or improved stability with lower material strengths, and which can be manufactured economically. A concave and a combine harvester are both configured with such concave segments.

In one embodiment, a concave segment for a combine harvester is created, which is provided for separating harvest. The concave segment extends in a circumferential direction about a concave axis in the form of a curve and comprises numerous finger strips. The finger strips each have a transverse strip, wherein the transverse strips each extend in a direction of extension parallel to the concave axis. Numerous fingers are disposed on each transverse strip.

The separation of harvest is a separation of grain and non-grain components of the harvest, in particular chaff and straw, from one another. The separation by means of the concave segment occurs in particular during threshing in the threshing unit and/or during separation in the separation device.

The concave segment extends in a curve about an imaginary concave axis in an axial direction. It may encompass the concave axis entirely or in part thereby, cylindrically or elliptically. The curve of the concave segment is preferably circular or oval. The numerous finger strips in the concave segment are preferably disposed adjacent to one another in the direction of the circumference. The fingers of the finger strips preferably extend in a straight line in the direction of the circumference. A curved curvature, in particular in the direction of the circumference, of the fingers and/or the transverse strips, is however likewise preferred.

The finger strips are preferably designed as molded bodies, in particular in a single piece. It is further preferred that the finger strips are substantially made of a wear-resistant steel. They are preferably molded while warm, in a press hardening process, and subsequently hardened. The fingers and the transverse strips of each finger strip particularly preferably have a substantially homogenous material strength thereby. The material strength is a function in part of the material thickness.

The concave segment is distinguished in that the fingers have a curved cross section and/or the transverse strips have a wave shape in the direction of extension. As a result, the stability of the finger strips of the concave segment is increased.

With the curved cross section design, the fingers have an outer curvature and an inner curvature. Both curvatures preferably face toward the concave axis. The curved design preferably has a curvature parallel to the direction of extension.

The stability of the fingers is increased by the fingers having a curved cross section, e.g. in comparison with flat fingers. As a result, the material strength and thus the weight of the finger, and thus the concave segment, can be reduced.

Furthermore, the outer curve reduces a depositing and/or lodging of harvest in and/or on the fingers. The curvature furthermore protects the harvest as a result of its rounded shape, by means of which straw breakage is reduced, and a subsequent cleaning of the harvest in the cleaning device is simplified.

The wave shape of the transverse strips likewise increases the stability of the finger strips, e.g. in comparison with flat transverse strips. As a result, the material strength and thus the weight can likewise be reduced.

Each transverse strip preferably has an upper surface and a lower surface. It is further preferred that the same wave shape is formed on the upper surface and the lower surface. In a preferred design, the upper surface of each transverse strip has the wave shape in the direction of extension. The upper surface preferably faces the concave axis thereby.

The fingers of adjacent finger strips are preferably disposed such that they are offset to one another in the axial direction. The offset of the fingers of adjacent finger strips is preferably designed such that the fingers are each disposed on a finger strip such that they are flush with a gap of the respective adjacent finger strips in and counter to the circumferential direction.

It is further preferred that the wave shape of the transverse strips has troughs and peaks. The fingers of the finger strips are preferably disposed flush with the troughs of the adjacent finger strips. Furthermore, the peaks are preferably disposed flush with the fingers of the same finger strips. The troughs reduce the lodging of harvest at passages in the concave segment. Because the upper surfaces of the transverse strips are preferably sunken in the troughs, an impact surface for the harvest is reduced there.

The peaks and/or troughs extend on the upper surface of the transverse strips, preferably away from the fingers in each case, up to or beyond a first edge on the upper surface of the transverse strips facing away from the fingers. The peaks are preferably extensions of the curves of the fingers. The peaks and troughs are also preferably rounded, in particular in and counter to the direction of extension, by means of which the straw breakage is likewise reduced, and the further cleaning of the harvest is simplified.

Alternatively to a wave shape, it is conceivable that the upper surface of the transverse strips has alternating concave and/or convex sections, by means of which the separation of the harvest is likewise improved.

In a preferred design, the fingers each have a free end. They are furthermore preferably parallel to one another. The fingers each preferably extend thereby from the transverse strip to their free end, for example perpendicular to the transverse strip. As a result, a lodging of harvest, in particular straw, between the fingers of the finger strips and the transverse strip of the adjacent finger in the direction of the circumference, and on or in the passages of the concave segment is reduced. The free end is preferably rounded off. Alternatively, it can also be angular.

In another preferred embodiment, the free ends of the fingers of the finger strips are each spaced apart from the transverse strips of their adjacent finger strips in the circumferential direction. As a result, there is a gap between the fingers and the transverse strips of two adjacent finger strips, which enlarges the passage, and improves a passage of the harvest through the concave segment. Furthermore, the lodging of harvest at the passages of the concave segment is reduced.

The transverse strips each preferably include a first and a second leg. Both legs are preferably disposed at an angle of >0°, in particular an angle of 90° to one another. The second leg preferably has the upper surface of the transverse strip thereby. The fingers preferably extend from the second leg to free ends. As a result of the legs being connected over an angle, in particular an angle of 90°, the stability of the transverse strips and the finger strips is further increased. As a result of the lower material strength due to the curved design of the fingers and/or the wave shape of the transverse strips, a bending radius between the two legs of the transverse strips can also be reduced, by means of which the peaks of the wave shape become sharp-edged. As a result, the separation of the harvest is further improved.

The concave segment preferably has a frame on which the finger strips are disposed. The finger strips are preferably each attached to the frame thereby by means of the first leg. By using a frame, the stability of the concave segment is increased. The frame can also involve the design of the passages. The frame preferably runs in a curve along the direction of the circumference. By attaching the finger strips to the frame by means of the first leg, they are economically and securely attached. Furthermore, they are preferably attached to the frame in a stationary manner, in particular, they are welded or screwed thereto.

Alternatively to a stationary attachment, it is preferred that the finger strips are each reversibly pivotable about the pivot axes. The pivot axes preferably extend thereby parallel to the transverse strips. As a result, a working angle of the finger strips and the fingers can be set. By this means, the size of the passages and/or an impact angle of the harvest on the finger strips can be adapted to a type of harvest, properties of the harvest, and machine parameters. The finger strips can preferably be pivoted about their pivot axes by means of at least one actuator for this. The control of the at least one actuator can be manual or automatic by means of a regulating and control device.

In a preferred design, a concave includes one or more concave segments, wherein the concave is a threshing concave having a concave segment for a tangential threshing unit for tangential combine harvesters and/or hybrid combine harvesters, and/or a separating concave having numerous concave segments for an axial separating device for hybrid combine harvesters, and/or a separating concave having numerous concave segments for an axial separating device for axial combine harvesters. As a result, the stability of the concave is increased, while the weight remains the same.

The axial separating device for axial combine harvesters preferably includes a threshing section and a separating section.

The concave, in particular the threshing concave or the separating concave, is preferably designed such that it partially encircles, in particular cylindrically or elliptically, the threshing drum or the separating rotor. The concave is also preferably disposed below the threshing drum or the separating rotor. The separating concave is preferably a lower part of a housing, which fully encompasses the separating rotor of the separating device in its entirety, cylindrically or elliptically.

The numerous concave segments are particularly preferably disposed adjacently to one another in the circumferential direction and/or behind one another in the axial direction. As a result, the concave can be easily replaced. Furthermore, as a result, the concave can be assembled in a modular manner from numerous identical or different concave segments. Moreover, a concave length and/or concave width can be adjusted, without changing the dimensions of the concave segment.

A combine harvester has at least one concave segment. As a result, the weight and costs of the combine harvester are reduced. The combine harvester is preferably designed as a tangential flux combine harvester, a tangential/axial flux hybrid combine harvester, or an axial flux combine harvester. The combine harvester is furthermore preferably a self-driving combine harvester.

The concave segment is preferably a component of the threshing concave of the threshing unit and/or the separating concave of the separating device. The separating device can have one or more sub-units, each of which includes an axial separating rotor and a housing having a separating concave.

BRIEF DESCRIPTION OF THE DRAWINGS

The various aspects shall be explained below in greater detail based on exemplary embodiments depicted in the drawings. Therein.

DETAILED DESCRIPTION

Figure 1:
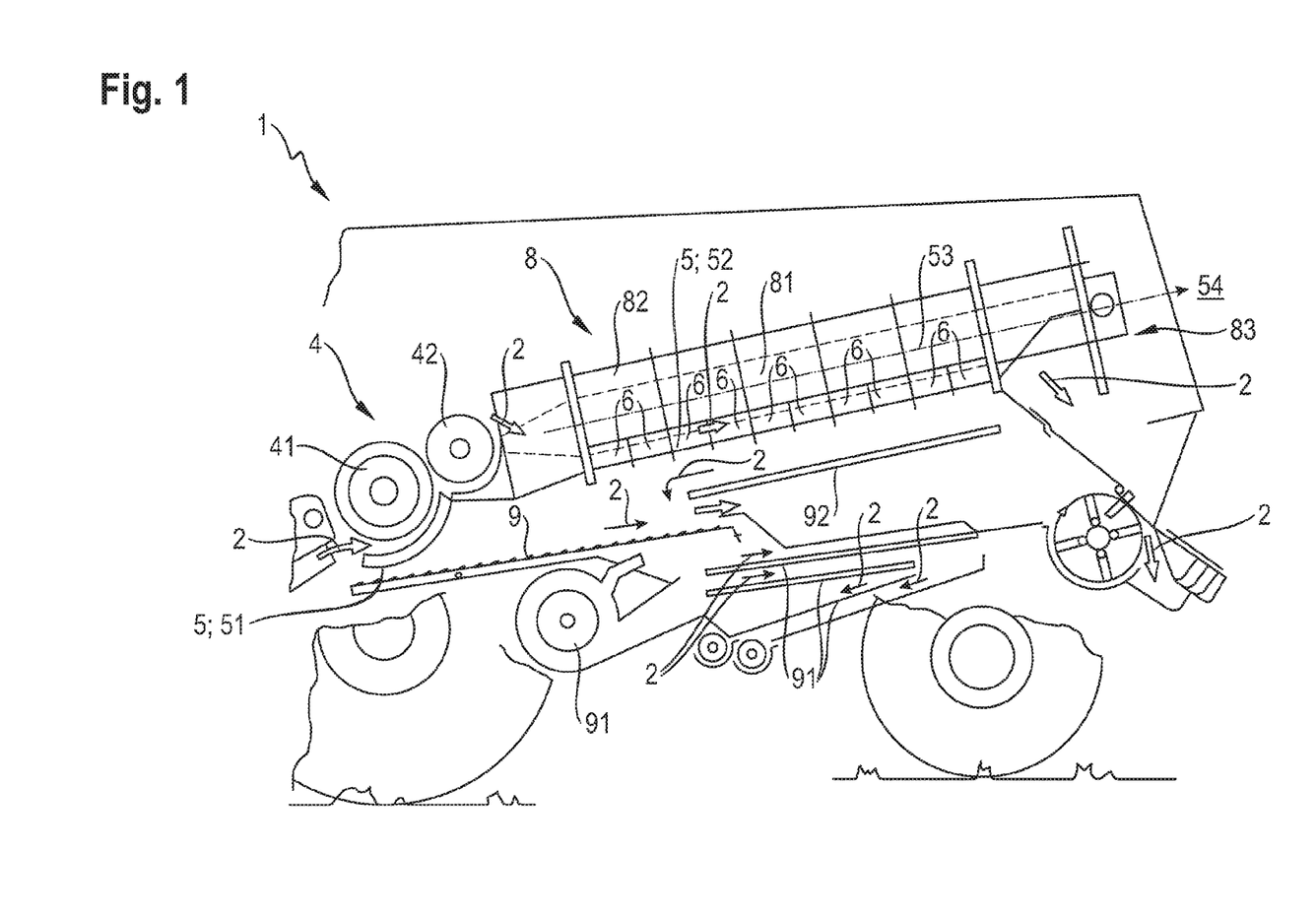
FIG. 1 shows a schematic side view of a combine harvester having an axial separating device.

FIG. 1 shows, schematically, a side view of a section of a self-driving combine harvester 1 having an axial separating device 8. A hybrid combine harvester is shown here.

Harvest 2 is cut during a harvest drive with an attachment (not shown) of the combine harvester 1, and supplied by means of a conveyor (not shown) of a threshing unit 4, in this case a tangential threshing unit 4.

The threshing unit 4 includes a threshing drum 41, a straw impeller drum 42 and a concave 5 designed as a threshing concave 51. The threshing concave 51 partially encompasses the threshing drum 41 from below. It is composed of one or more concave segments 6 as explained in greater detail below. In addition, the threshing unit 4 can include an accelerating drum (not shown), wherein the threshing concave 51 can then partially encompass the accelerating drum as well. The threshing drum 41 threshes the harvest 2 at the threshing concave 51. The harvest 2, composed substantially of grain separated at the threshing concave 51, falls through the at least one concave segment onto the preparation base 9, from where it is conveyed to a cleaning device 91. The remaining harvest 2 composed substantially of straw, chaff and residual grain is supplied to an axial separating device 8 by means of the straw impeller drum 42.

The axial separating device 8 includes a separating rotor 81 and a housing 82 that cylindrically and entirely encompasses the separating rotor 81. The housing 82 has a lower housing part 83, which includes a concave 5 designed as a separating concave 52. The concave 5 cylindrically and partially encompasses the separating rotor 81, and has an imaginary concave axis 53. The concave 5 includes a plurality, meaning two or more, concave segments 6, which are disposed behind one another in the axial direction 54, and in one embodiment numerous concave segments.

The separating rotor 81 picks up the harvest and conveys it on a helical track (not shown) about the concave axis 53 through the housing 82 of the separating device 8. The harvest 2, substantially composed of residual grain, chaff and straw, is separated thereby at the separating concave 52. The residual grains and the chaff of the harvest 2 fall through the concave segments 60 onto a return base 92. From there, the harvest 2 is supplied to the cleaning device 91 via the preparation base 9.

The harvest 2 composed substantially of straw remaining in the separating device 8 is conveyed in the axial direction 54 out of the axial separating device 8, and ultimately discarded to the rear of the combine harvester 1.

Figure 2A:
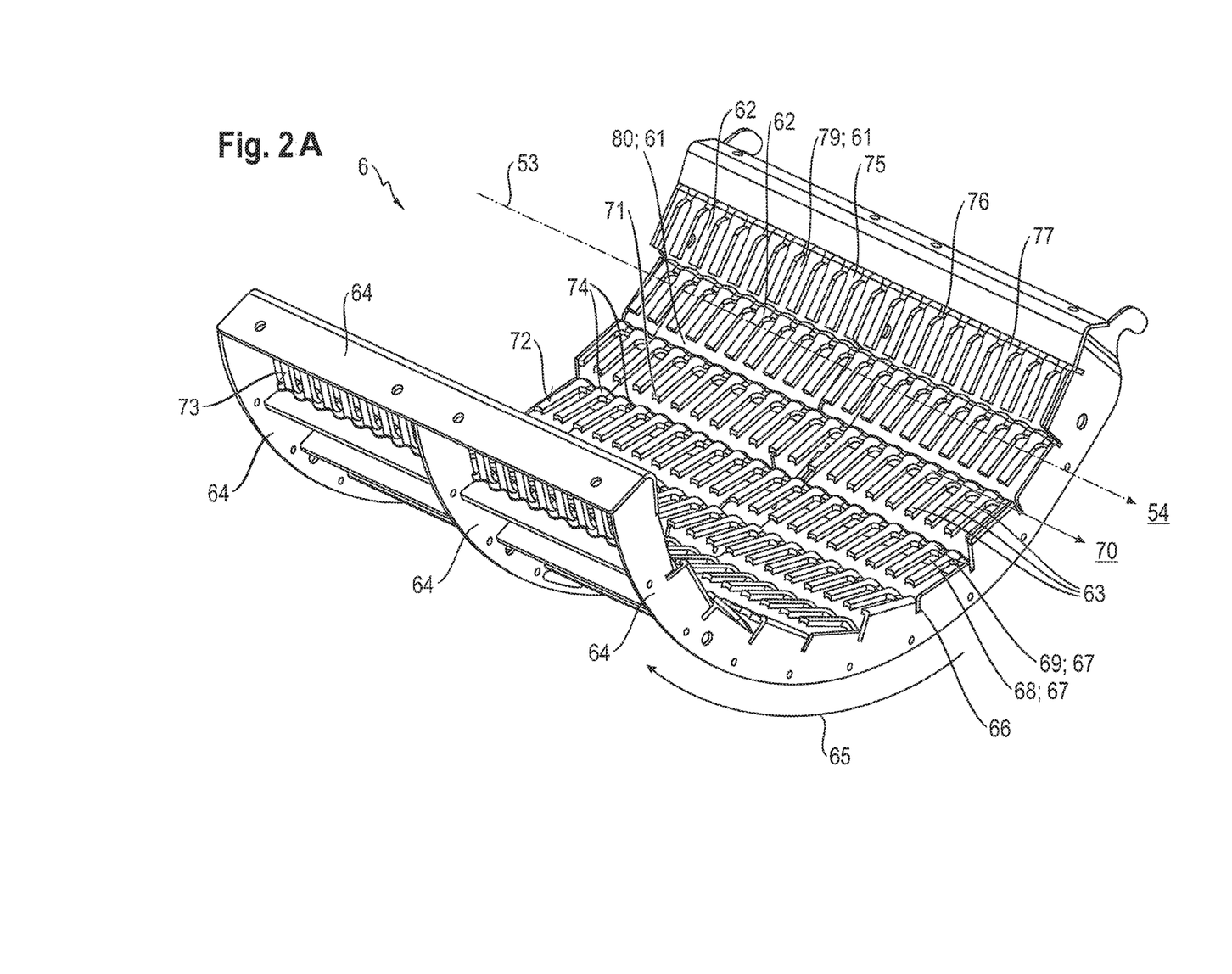
FIG. 2A shows a concave segment in a perspective view.
Figure 2B:
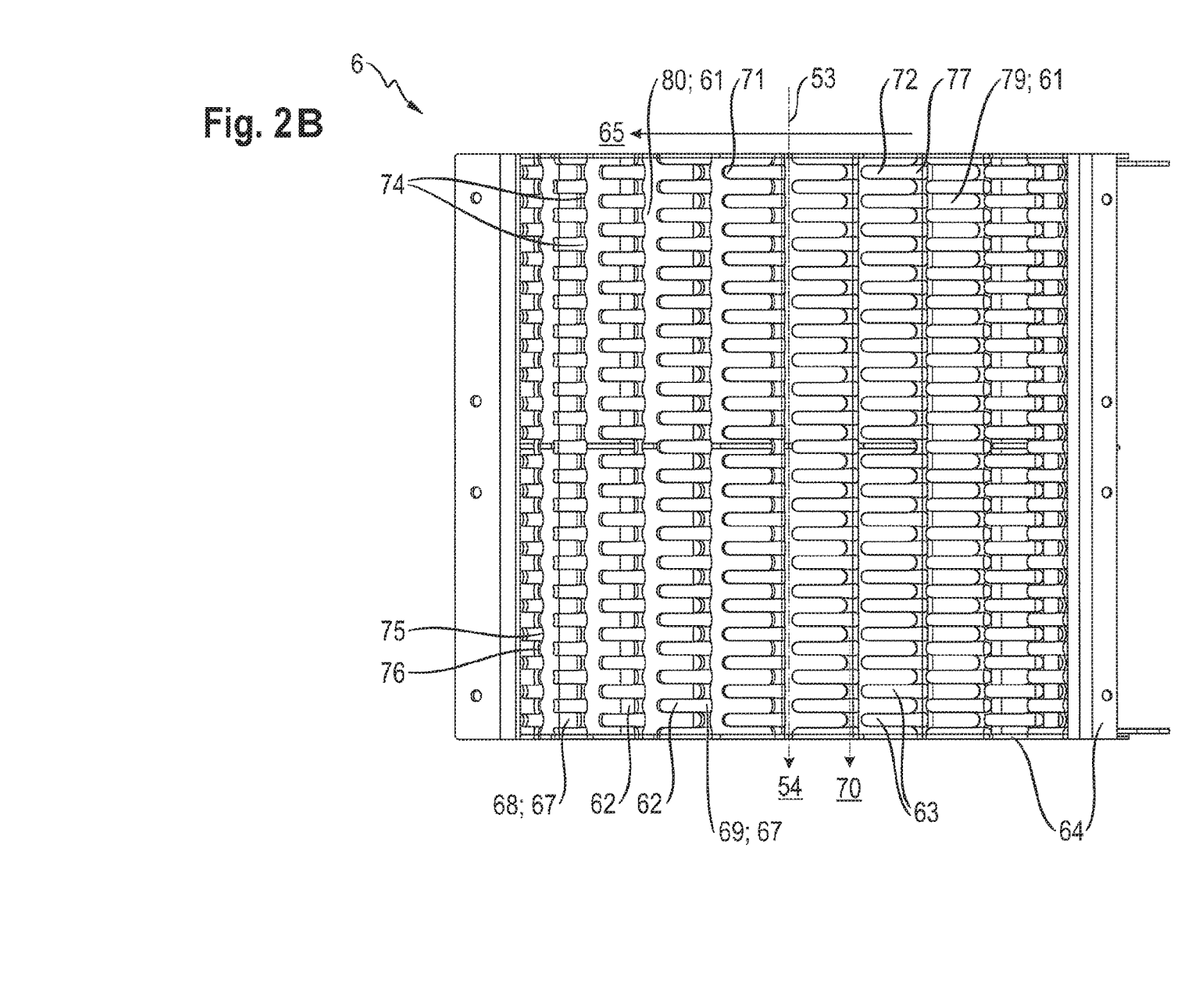
FIG. 2B shows a concave segment in a view from above.

FIGS. 2A and B show two embodiments of the concave segment 6 incorporated into the concave 5 designed as a separating concave 52. FIG. 2A shows a perspective view of the concave segment 6 having a plurality of, meaning two or more, finger strips 62 with flat-ended free ends 71 of fingers 63. FIG. 2B shows a view of a concave segment 6 from above, having finger strips 62 with rounded free ends 71 of fingers 63. The concave segment 6 extends in a curve, which is circular here, about an imaginary concave axis 53 extending in the axial direction 54. The concave axis 53 is only partially encompassed thereby.

The concave segment 6 has a curved frame 64, on which the finger strips 62 are disposed in the direction of the circumference 65 of the concave segment 6. For this, the finger strips 62 are attached in grooves 66 in the frame 64, in particular, they are welded thereto in one embodiment.

The finger strips 62 form passages 61 in the concave segment 6. The finger strips 62 furthermore have an upper surface 77 facing the concave axis 53. The finger strips 62 each comprise a transverse strip 67, which extends in a direction of extension 70 parallel to the concave axis 53. A plurality of fingers 63 are disposed on the transverse strips 67, each of which extends away, for example perpendicular to the transverse strip, from the transverse strip 67 to the free ends 71. Gaps 79 extend between the individual fingers 63 of each finger strip 62.

The fingers 63 of adjacent finger strips 62 in the direction of circumference 65 are disposed offset to one another in the axial direction 54. The fingers 63 of the finger strips 62 are disposed flush to the gaps 79 of the adjacent finger strips 62 in and counter to the circumferential direction 65. Furthermore, the fingers 63 are spaced apart, parallel to one another. They are substantially oriented in the circumferential direction 65 thereby. The free ends 71 of the fingers 72 of the finger strips 62 are each spaced apart from the transverse strip 67 of their adjacent finger strip 62 in the circumferential direction 65, by means of which a gap 80 is created between the finger strips 62. The gaps 80 and the gaps 79, collectively, form the passages.

Each finger 63 has a curved design, and thus has a curvature with an outer curvature 72, shown as an outer convex surface, and an inner curvature 73, shown as an inner concave surface. The outer curvature 72 is located thereby on a side of the finger 63 facing the concave axis 53, and the inner curvature 73 is located on a side of the finger 63 facing away from the concave axis 53.

Each transverse strip 67 has a first and a second leg 68, 69. The transverse strips 67 are attached in the grooves 66 of the frame 64 by means of the first leg 68. The fingers 63 are disposed on the second leg 69 of the transverse strips 67. The fingers 63 are cantilevered, and extend from the second leg 69 to a free end 71, for example at a right angle to the second leg.

Figure 3A:
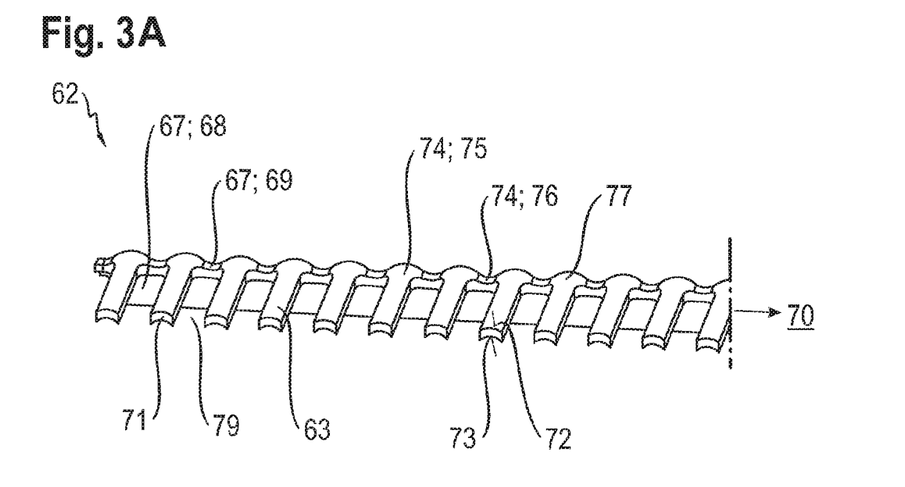
FIGS. 3A and B show perspective views of a finger strip.

FIGS. 3A and B show perspective views of a section of a finger strip 62. The two legs 68, 69 of the transverse strips 67 are connected to one another at an angle of 90°, and have a bending radius 78 between them. The fingers 63 are disposed on the second leg 69 of the transverse strip 67 and extend in each case to a free end 71. In this case, each free end 71 of the respective finger 63 is flat. In particular, this exemplary embodiment serves to provide a better illustrative depiction of the outer and inner curvatures 72, 73 of the fingers 63, as is also the case in FIG. 2A. The design having rounded free ends 71 of the respective fingers 63 is preferred, however, as is depicted in FIG. 2B.

Figure 3B:
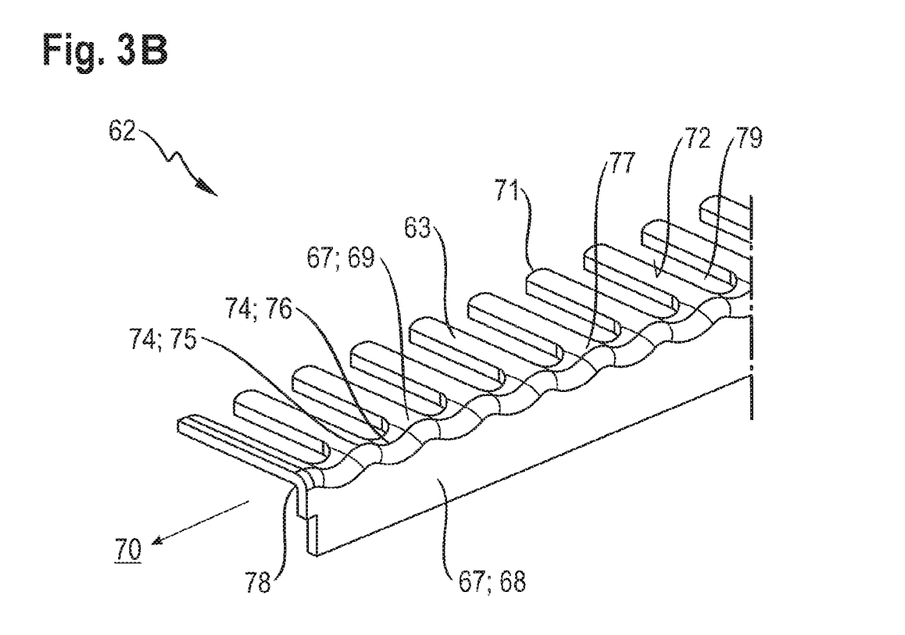

The second leg 69 of the transverse strips 67 has a wave shape 74, which extends along the direction of extension 70. Furthermore, it has the same wave shape 74 on the upper surface 77 and the lower surface of the second leg 69 of the transverse strips 67. The wave shape 74 has peaks 75, which have a convex curvature, and troughs 76, which have a concave curvature. The peaks 75 and troughs 76 are located on the upper surface 77 of the second leg 69 of the transverse strips 67. The upper surface 77 faces the concave axis thereby. The peaks 75 on the upper surface are aligned and disposed flush with the fingers 63. The peaks 75 on the upper surface are furthermore substantially an extension of the outer curvature 72 of the fingers 63, meaning the outer convex surfaces are aligned and continuous. The troughs 76 on the upper surface are aligned and disposed flush with the gaps 79 of the same finger strips 62. The troughs 76 on the upper surface are furthermore disposed between the fingers 63.

During separation of the harvest 2 in the axial separating device 8, the harvest 2, substantially composed of residual grain, chaff, and in particular, straw, is conveyed past the concave segments 6 of the concave 5 in the circumferential direction 65 by means of the separating rotor 81. Due to the curved design of the fingers 63, in particular their outer curvature 72, and due to the gaps 79 in front of the peaks 75 of the transverse strips 67, the harvest 2 is directed and conveyed thereby toward peaks 75 of the transverse strips 67 in particular. A separation of the harvest 2 occurs in particular when the harvest 2 strikes the peaks 75. The separated harvest 2, formed substantially of grain and chaff, falls through the passages 61 of the at least one concave segment 6.

LIST OF REFERENCE SYMBOLS 1 combine harvester
2 harvest
4 threshing unit
41 threshing drum
42 straw impeller drum
5 concave
51 threshing concave
52 separating concave
53 concave axis
54 axial direction
6 concave segment
61 passage
62 finger strip
63 finger
64 frame
65 circumferential direction
66 groove
67 transverse strip
68 first leg
69 second leg
70 direction of extension
71 free end of the finger
72 outer curvature
73 inner curvature
74 wave shape
75 peak
76 trough
77 upper surface
78 bending radius
79 gap
80 gap
8 axial separating device
81 separating rotor
82 housing
83 lower housing part
9 preparation base
91 cleaning device
92 return base

The invention claimed is:

1. A concave segment for a combine harvester, provided for separating harvest, extending in a curve about a concave axis in a circumferential direction, the concave segment comprising:
a curved frame extending in a curve about the concave axis; and
a plurality of finger strips, wherein the plurality of finger strips each have a transverse strip, wherein the transverse strips are transverse to the finger strips and are attached to the curved frame, each transverse strip extending in a direction of extension parallel to the concave axis, and wherein a plurality of fingers are disposed on each of the transverse strips,
wherein at least some of the fingers have a first side and a second side and have a curved cross section,
wherein the first side is opposite the second side,
wherein the first side has an outer curvature and faces the concave axis and the second side has an inner curvature; and
Wherein a cross-section of a free end of the at least some of the fingers is curved in a direction parallel to the transverse strips.

2. The concave segment according to claim 1, wherein the transverse strips each have an upper surface,
wherein the upper surface has a wave shape in the direction of extension,
wherein the upper surface faces the concave axis,
wherein a peak of the wave shape of the upper surface is disposed flush with the outer curvature of the fingers, and
wherein the peak of the wave shape is rounded and counter to the direction of extension.

3. The concave segment according to claim 2, wherein a trough of the wave shape of the upper surface are disposed flush with gaps of a same finger strip; and
wherein the trough of the wave shape is rounded and counter to the direction of extension.

4. The concave segment according to claim 2, wherein a wave shape of transverse strips has troughs and peaks,
wherein the fingers of the finger strips are disposed flush with the troughs of adjacent finger strips, and
wherein the peaks are disposed flush with the fingers of same finger strips.

5. The concave segment according to claim 1, wherein free ends of the fingers of the finger strips are each spaced apart from transverse strips of adjacent finger strips in the circumferential direction such that a gap is between the fingers and the transverse strips of the adjacent finger strips;
wherein the transverse strips each comprise a first leg and a second leg, which are disposed at an angle greater than 0° to one another;
wherein the finger strips are attached to the frame using a respective first leg; and
wherein the second leg defines an upper surface of the transverse strip, and the fingers extend from the second leg to a free end.

6. The concave segment according to claim 1, wherein the finger strips are reversibly pivotable about respective pivot axes that extend parallel to the transverse strips.

7. A concave device for a combine harvester comprising:
a plurality of concave segments extending in a curve about a concave axis in a circumferential direction, each of the plurality of concave segments comprising:
a plurality of finger strips, wherein the finger strips each have a transverse strip, wherein the transverse strips each extend in a direction of extension parallel to the concave axis, and wherein a plurality of fingers are disposed on each of the transverse strips, wherein at least some of the fingers have a first side and a second side and have a curved cross section of a free end in a direction parallel to the transverse strips, wherein the first side is opposite the second side, and wherein the first side has an outer curvature and faces the concave axis and the second side has an inner curvature, wherein the concave device is a threshing concave device for a tangential threshing unit for tangential combine harvesters and/or hybrid combine harvesters.

8. The concave device according to claim 7, wherein the plurality of concave segments comprise an axial separating device for hybrid combine harvesters.

9. The concave device according to claim 7, wherein the plurality of concave segments are disposed adjacent to one another in a circumferential direction and/or behind one another in an axial direction.

10. A combine harvester having at least one concave segment according to claim 1.

11. A concave segment for a combine harvester, the concave segment extending in a curve about a concave axis in a circumferential direction, the concave segment comprising:
   a plurality of finger strips extending in an axial direction, wherein the finger strips each comprise:
      a transverse strip having an upper surface with an undulating wave shape extending in the axial direction, the undulating wave shape on the upper surface defining peaks and troughs along the upper surface; and
      a plurality of fingers coupled to and extending from the transverse strip, wherein at least some of the fingers have a curved cross section of a free end in a direction parallel to the transverse strip with an upper convex surface facing the concave axis and a lower concave surface facing away from the concave axis.

12. The concave segment according to claim 11, wherein the upper convex surface of the fingers are aligned with the peaks of the upper surface of the transverse strip.

13. The concave segment according to claim 12, wherein the plurality of fingers are spaced apart in the axial direction and define gaps therebetween.

14. The concave segment according to claim 1, wherein the first side comprises an outer convex surface; and
   wherein the second side comprises an inner concave surface.

15. The concave segment according to claim 14, wherein the first side comprises a same wave shape as the second side.

16. The concave segment according to claim 1, wherein the transverse strips have an upper surface and a lower surface;
   wherein the upper surface has a wave shape; and
   wherein the lower surface has a wave shape.

17. The concave segment according to claim 16, wherein the wave shape for the upper surface is the same as the wave shape for the lower surface.

18. The concave segment according to claim 1, wherein the fingers of adjacent finger strips are positioned such that the fingers are offset to one another in the axial direction; and
   wherein the offset of the fingers of the adjacent finger strips result in the fingers being positioned in the respective finger strip such that the fingers are flush with a gap of the respective adjacent finger strips in and counter to the circumferential direction.

19. The concave segment according to claim 1, wherein the transverse strips each comprise a first leg and a second leg, which are disposed at an angle 90° to one another;
   wherein respective fingers extend from the second leg to a free end of the respective finger; and
   wherein the transverse strips are connected to the frame at the first leg.

* * * * *